United States Patent [19]

Kawakatsu

[11] Patent Number: 4,496,098

[45] Date of Patent: Jan. 29, 1985

[54] PROCESS FOR PRODUCING A TIN/LEAD ALLOY SOLDER JOINT WITH LESS WETTING AGENT RESIDUE

[76] Inventor: Ichiro Kawakatsu, 30-13-3 chome, Saginomiya, Nakano-ku, Tokyo, Japan

[21] Appl. No.: 361,612

[22] Filed: Mar. 25, 1982

[51] Int. Cl.$^3$ ................................................. B23K 1/02
[52] U.S. Cl. ..................................... 228/219; 228/220; 228/223
[58] Field of Search .................. 148/23; 228/219, 223, 228/220, 221

[56] References Cited

U.S. PATENT DOCUMENTS

| Re. 30,696 | 8/1981 | Arbib et al. | 148/23 |
| 2,700,628 | 1/1955 | Rosa et al. | 148/23 |
| 3,436,278 | 4/1969 | Poliak | 148/23 |
| 4,180,419 | 12/1979 | Thompson, Jr. | 148/23 |
| 4,342,606 | 8/1982 | Notton | 148/23 |

OTHER PUBLICATIONS

*Welding Handbook*, vol. 2, Seventh Ed., (1978), pp. 654–655.

*Primary Examiner*—Kenneth J. Ramsey
*Attorney, Agent, or Firm*—Cushman, Darby & Cushman

[57] ABSTRACT

Surfaces of copper or brass which are to be joined by tin/lead alloy soldering in a non-oxydizing atmosphere are first wetted by a treating liquid containing an organic solvent typified by ethyl alcohol; a polyhydric alcohol derivative typified by ethylene glycol; and an organic, halogen-containing activator typified by aniline hydrochloride. In the resulting soldered joint, the solder has spread acceptably well and little oxidation or wetting agent resident is formed.

4 Claims, No Drawings

PROCESS FOR PRODUCING A TIN/LEAD ALLOY SOLDER JOINT WITH LESS WETTING AGENT RESIDUE

BACKGROUND OF THE INVENTION

In the soldering of the metals, especially soft soldering, it is generally necessary to use inorganic or organic flux, however, it usually complicates the process, and the removal of the flux residue and the corrosion caused by the flux sometimes produces serious defects.

SUMMARY OF THE INVENTION

The metallic material to be soldered and the solder alloy are initially immersed in a liquid which contains an organic solvent, polyhydric alcohol derivative and an organic halogen activator and then placed in a non-oxidizing gas atmosphere, for example, of nitrogen, argon or the mixture of them and hydrogen in which the materials and the solder alloy are heated to above the melting point of solder alloy in the gas and the step of soldering is thereby completed.

The new process provides good soldering and makes it unnecessary to wash off residue as must be done in the case of soldering with flux, and the possibility of corrosion caused by flux is obviated.

During the process of soldering, the organic solvent is immediately vaporized and provides a reducing atmosphere. The viscous polyhydric alcohol derivatives contained in the treating liquid control the dispersion of organic solvents and prolong its activity.

Polyhydric alcohol derivatives also may aid in providing the reducing atmosphere.

The addition of the organic halogen activators activates the surface of the material to be soldered and so makes the soldering easier.

Because all of the soldering process is conducted in the environment of a gas which is devoid of oxygen, no oxidation takes place on the surfaces which are being soldered and excellent soldered joints are formed without flux residue needing removal. The strength of the soldered joints is equivalent to conventional soldered joints using flux.

As the organic solvent, an organic solvent in the boiling point range of 30° C. to 160° C. exemplified by acetone ethyl alcohol, benzene and their derivatives may be used.

As the polyhydric alcohol derivatives, ones in the boiling point range of 170° C. to 320° C. which are viscous liquids may be used. Among polyhydric alcohol derivatives, if glycerin or ethylene glycol which possesses the higher boiling point range of 170° C. to 320° C. and a higher viscosity is added, it not only controls the organic solvent from vaporization and dispersion, the polyhydric alcohol derivative itself stays as an active atmosphere around the parts to be soldered.

As the organic halogen activator, any one or more of dimethylamine hydrochloride, aniline hydrochloride, and glutamine hydrochloride may be used.

The major portion of these activators is dispersed with the solvent vapour and the gas while they are heated to the soldering temperature leaving no residue and so they produce very few defects and almost no corrosion such as is conventionally caused by flux.

The quality of soldered joints prepared using the process of the present invention has been evaluated as follows: on square plates (25×25 mm×0.3 mm thick) of copper and brass were placed various pieces of solder ($\phi$3 mm×0.1 mm thick). Then after applying various treating liquids made of the constituents mentioned above, the liquid-treated, solder piece-bearing plates were immersed in a flow of nitrogen gas and heated to 50° C. above the melting point of each testing solder. The spread area of each piece of solder was observed. Four particular examples are now given.

Ex. 1—As a treating liquid there was used a mixture of isopropyl alcohol 90%—glycerin 8%—dimethylamine hydrochloride 2%, and as solder alloys a few kinds of alloys composed of tin and lead were used. The spread area on the copper plate was determined and found to be adequate.

Ex. 2—As a treating liquid there was used a mixture of isopropyl alcohol 90%—glycerin 7%—dimethylamine hydrochloride 3%, and as a solder alloy a solder alloy as in Ex. 1 was used. The spread area on a brass plate was determined and found to be not so great as on copper, yet acceptable.

Ex. 3—As a treating liquid, there was used a mixture of ethyl alcohol 90%—ethylene glycol 8%—aniline hydrochloride 2% and as a solder alloy a solder alloy as in Ex. 1 was used. The spread area was determined and found to be good.

Ex. 4—As a treating liquid, there was used a mixture of ethyl alcohol 90%—ethylene glycol 7%—aniline hydrochloride 3% and as a solder alloy a solder alloy as in Ex. 1 was used. The spread area on brass plate was determined. Despite the fact that brass generally exhibits less solderability than copper, good values for soldering were obtained.

As shown in the examples described above, using a tin/lead solder alloy on copper and brass plates, the new process made excellent soldering feasible. Not only was very little oxidation or dyeing produced on the material surface, but also very little residue was left from the treating liquid. Unless there is any treatment after soldering, very little corrosion caused by residue takes place.

One could further add rosin to the organic solvent, and provide the same effect around the parts but it tends to increase the amount of residue that is left.

What is claimed:

1. In a soldering process in which a tin/lead solder alloy is to be melted to form a joint with a surface of a piece of copper or brass while the surface is protected against oxidation by being surrounded by a non-oxidizing gaseous atmosphere, the improvement comprising:
   as a preliminary step, coating said surface with a liquid wetting agent which is a mixture consisting essentially of an organic solvent having a boiling point in the range of 30° C. to 160° C., a relatively viscous polyhydric alcohol derivative having a boiling point in the range of 170° C. to 320° C., and an organic halogen-containing activator, so that as the solder joint is made so little oxidation and wetting agent residue is formed that no residue removal step likely to generate corrosion is needed; and
   the step of melting the tin/lead solder alloy is conducted so soon after said coating step, that resulting vaporization of said organic solvent during the solder melting step contributes to said gaseous atmosphere.

2. The improved soldering process of claim 1, wherein:

the organic solvent is at least one constituent selected from the group consisting of isoproyl alcohol, ethyl alcohol, acetone, benzene.

3. The improved soldering process of claim 1, wherein:

the polyhyric alcohol derivative is at least one constituent selected from the group consisting of glycerin and ethylene glycol.

4. The improved soldering process of claim 1, wherein:

the organic halogen-containing activator is at least one constituent selected from the group consisting of dimethylamine hydrochloride, aniline hydrochloride and glutamine hydrochloride.

* * * * *